Nov. 18, 1947.    J. A. SAFFIR    2,431,086
ARTIFICIAL TOOTH
Filed March 13, 1943

INVENTOR.
Jacob A. Saffir
BY

Patented Nov. 18, 1947

2,431,086

UNITED STATES PATENT OFFICE 2,431,086

ARTIFICIAL TOOTH

Jacob A. Saffir, Kew Gardens, N. Y., assignor to Dentists' Supply Company of New York, New York, N. Y., a corporation of New York Application March 13, 1943, Serial No. 479,003

4 Claims. (Cl. 32—8)

This invention relates to artificial teeth, and more particularly to an improvement in the structure of the masticatory portion thereof.

This invention overcomes some of the great difficulties in synthetic resin teeth which have more or less limited their use to temporary dentures and which have been the cause of the general public's not being able to benefit from other very desirable characteristics of a soft resinous material.

The main object of this invention is to provide a tooth wherein the plate and denture is not ruined when the plastic occlusal surfaces are worn down, but wherein new occlusal surfaces can be added at will by a simple means to be described later.

Plastic teeth have been made entirely from synthetic resin, mainly methyl methacrylate, and while they offer the great advantage of softness, the Brinell hardness of acrylic being 18 to 20 as compared to the Brinell hardness of porcelain which can be as high as 600, yet their wear is so rapid that, as has been pointed out in dental literature, when methyl methacrylate teeth are used in a denture, that denture must be considered just a temporary one.

This, of course, means that a new denture will have to be made at great expense to the patient and at the cost of much time to the dentist. Furthermore, for probably a good portion of the time prior to the complete wearing out of the teeth, the patient has been wearing teeth with very poor or no anatomy on the occlusal surface. This makes chewing difficult and less efficient and may affect the health of the patient. It also tends to lessen the vertical dimensions of the face (close the bite) which not only is annoying to the patient but may lead to disturbances in the temperomandibular joint.

Another object of this invention is to provide a tooth in which the dentist may without destruction or injury to the plate or body of the tooth adjust the height of the teeth and thus add or detract from the vertical dimensions of a face, with great ease, and at little expense to the patient.

Another object of this invention is to provide a tooth whose body is of strong, durable, and hard material and whose occlusal portion is soft so as to greatly reduce the tendency to clicking, said materials desirably being adapted for dental prosthesis.

Another object of this invention is to provide a tooth which is lighter in weight than an all porcelain tooth.

In order to more fully illustrate the invention, reference will now be made to the accompanying drawings wherein certain examples are shown by way of illustration.

A more detailed description of these will now be given. Similar numerals indicate similar structural portions on the various figures of the drawings.

Figure 1:
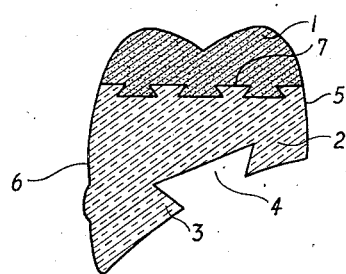
Figure 1 is a section from buccal to lingual of a posterior tooth.
Figure 2:
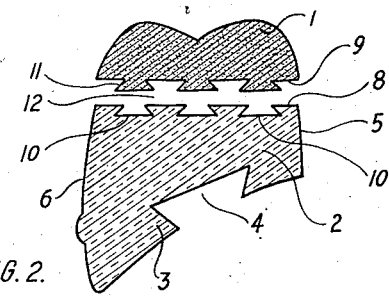
Figure 2 is a similar section of the same tooth with the resinous occlusal portion separated from the body of the tooth.

Referring now to Figures 1 and 2, a tooth is shown with the occlusal surface at 1. At 2 is the body of the tooth. At 3 is the gingival portion and at 4, the retention means for retaining the tooth in the denture base material. At 5 is the lingual surface and at 6 is the buccal surface. At 7 is the line of junction between the hard porcelain body and the artificial resinous occlusal portion.

In Figure 2, at 8, is the upper surface of the porcelain showing undercuts at 10 for receiving and retaining the softer artificial resin. The body and occlusal portion are separated in this figure by the space. At 11, are the retention means on the occlusal or resinous portion of the tooth.

Figure 3:
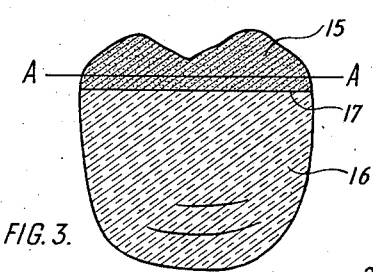
Figure 3 is a view of the buccal surface of a posterior tooth.

In Figure 3, at 15 is the occlusal surface of resinous plastic and at 16 is the body of porcelain. At 17 is the line between the plastic and porcelain.

When a dentist has made a denture with teeth as herein described, he instructs his patient to return at intervals, depending on the chewing habits of the patient, so that when the occlusal surface has worn to point A—A in Figure 3, the occlusal portion of the tooth can be replaced. A tobacco chewer might have to return every three to four months; and an average individual could go perhaps from six to ten months.

To replace the occlusal surfaces, all of the old resin is removed by carefully warming the occlusal surfaces over a flame and when the resin is soft, peeling or scraping it out with an instrument. Or, the resin can be dissolved off with suitable solvents. When all the resin has been removed, the occlusal surfaces are rebuilt with wax to the proper height. The teeth can then be tried in the mouth or adjusted on the articulator. The case is then invested in a flask and with a process well known by anyone in the dental laboratory art, new plastic of the proper shade is cured on the occlusal aspect, No. 17 (Fig. 3) of the body of the tooth.

Similarly if a patient receives a new denture with teeth as described in this invention, and neither she nor the dentist are perfectly satisfied with the vertical dimension, it being too long or too short, the condition can be remedied very easily by merely removing the resinous occlusal portion and replacing with a more suitable sized occlusal portion.

Figure 4:
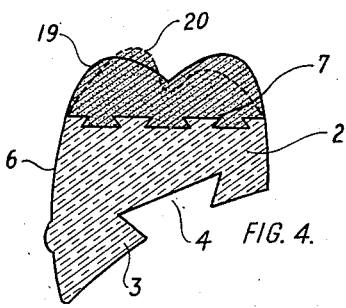
Figure 4 is a sectional view of a posterior tooth from labial to lingual.

Figure 4 is illustrative of a tooth in cross section with the gingival at 3, the gingival retention means at 4, the line of demarcation between body and occlusal portion at 7. At 2 is the lingual; at 6, the buccal. At 19, the solid line indicates the occlusal surface. If a dentist were so to construct a tooth and then discover that he had too little surface occluding, he could reconstruct his occlusal surface and make it larger as is illustrated at 20 in this same figure.

It will, therefore, be seen that by using a tooth as herein described, the dentist need not be satisfied with a nearly correct surface, nor yet reconstruct the entire denture if a bad error in judgment accrued. A mere and simple reconstruction of the occlusal surface may be applied and excellent results can be brought about.

Figure 5:
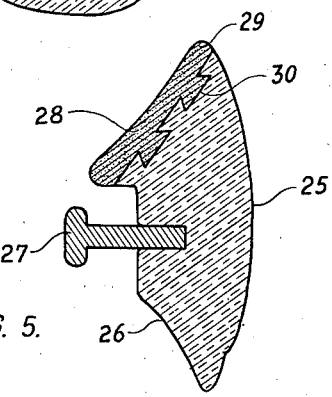
Figure 5 is a section from labial to lingual of an anterior tooth.

In Figure 5, at 25, is the labial surface; at 26, the gingival; at 27, the retention pin for retaining this anterior tooth in the denture base material. At 28 is the lingual surface of the biting portion of the tooth and it is made of the soft resinous materials. At 29 is the incisal tip and at 30, the retention means.

Figure 6:
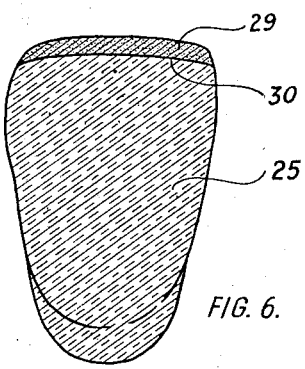
Figure 6 is the labial view of an anterior tooth.

Figure 6 shows a labial aspect of the same tooth as in Figure 5. At 25, is the labial; at 29, the incisal tip of artificial plastic resin. At 30, is the junction line of the porcelain body material and the resin, which line may be varied by the manufacturer or the dentist.

Figure 7:
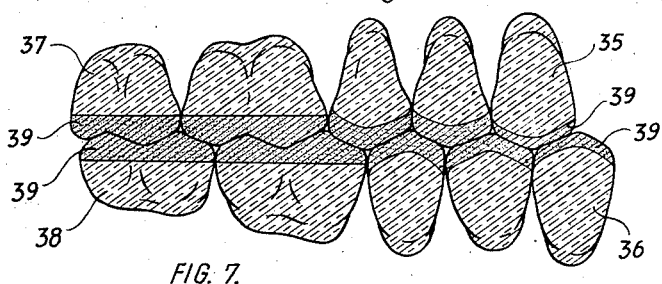
Figure 7 is the buccal view of ten posterior teeth in articulation from the cuspids back to the second molars inclusive.

Figure 7 shows a group of ten teeth in occluison. At 35 is the maxillary cuspid; at 36 the mandibular cuspid; at 37, the maxillary second molar; at 38, the mandibular second molar; and at 39 is illustrated the placement of the soft, artificial resin during articulation. As can be seen, it covers all the areas that are in contact and acts like a cushion during mastication.

In compliance with the requirements of the patent statutes, I have herein shown a number of preferred embodiments of my invention. It is, however, to be understood that the invention is not limited to the precise structures here shown, the same being merely illustrative of the principles of my invention.

What I consider new and desire to secure by Letters Patent is as follows:

1. An artificial tooth comprising a body portion of relatively hard and durable material and a separate occlusal portion of relatively softer and less wear-resistant material, said body and occlusal portions being removably secured together along a plane which terminates near the tip of the tooth to permit replacement of said occlusal portion while said body portion remains intact.

2. An artificial tooth comprising a body portion of relatively hard and durable material and a separate occlusal portion of relatively softer and less wear-resistant material, said body and occlusal portions being removably secured together in mechanically interlocked relationship along a plane which terminates near the tip of the tooth to permit replacement of said occlusal portion while said body portion remains intact.

3. An artificial tooth as in claim 1, wherein the occlusal portion is of a plastic resinous material in essentially solid state and is susceptible to modification of its physical state for removal from the body portion.

4. An artificial tooth as in claim 2, wherein the occlusal portion is of a plastic resinous material in essentially solid state and is susceptible to modification of its physical state for removal from the body portion.

JACOB A. SAFFIR.

REFERENCES CITED

The following references are of record in the file of this patent:

UNITED STATES PATENTS

| Number | Name | Date |
|---|---|---|
| 2,279,067 | Shapiro | Apr. 7, 1942 |
| 2,163,014 | Voigt | June 20, 1939 |
| 2,302,375 | Myerson | Nov. 17, 1942 |
| 2,327,548 | Pearlman | Aug. 24, 1943 |
| 1,384,282 | Tuttle | July 12, 1921 |
| 996,818 | Weldon | July 4, 1911 |
| 1,393,166 | Raumeguere | Oct. 11, 1921 |

FOREIGN PATENTS

| Number | Country | Date |
|---|---|---|
| 97,227 | Austria | June 10, 1924 |
| 568,573 | Germany | Jan. 21, 1937 |

OTHER REFERENCES

Dental Digest, June 1940, vol. 46, pp. 202–204.
Dental Digest, Dec. 1940, vol. 46, pp. 419–421.